(12) United States Patent
Hou et al.

(10) Patent No.: US 11,727,439 B2
(45) Date of Patent: *Aug. 15, 2023

(54) GENERATING OPTIMIZED IN-CHANNEL AND CROSS-CHANNEL PROMOTION RECOMMENDATIONS USING FREE SHIPPING QUALIFIER

(71) Applicant: Groupon, Inc., Chicago, IL (US)

(72) Inventors: Feili Hou, Los Altos, CA (US); Vyomkesh Tripathi, Mountain View, CA (US); Nipun Agarwal, Fremont, CA (US); Rajesh Girish Parekh, San Jose, CA (US)

(73) Assignee: GROUPON, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/734,547

(22) Filed: May 2, 2022

(65) Prior Publication Data
US 2022/0398629 A1 Dec. 15, 2022

Related U.S. Application Data

(63) Continuation of application No. 16/879,330, filed on May 20, 2020, now Pat. No. 11,354,703, which is a continuation of application No. 14/693,721, filed on Apr. 22, 2015, now Pat. No. 10,699,299.

(60) Provisional application No. 61/989,977, filed on May 7, 2014, provisional application No. 61/982,834, filed on Apr. 22, 2014.

(51) Int. Cl.
*G06Q 30/00* (2023.01)
*G06Q 30/0251* (2023.01)
*G06F 16/955* (2019.01)
*G06F 16/2457* (2019.01)
*G06Q 30/0241* (2023.01)
*G06Q 30/02* (2023.01)

(52) U.S. Cl.
CPC ... *G06Q 30/0255* (2013.01); *G06F 16/24578* (2019.01); *G06F 16/955* (2019.01); *G06Q 30/02* (2013.01); *G06Q 30/0269* (2013.01); *G06Q 30/0277* (2013.01)

(58) Field of Classification Search
None
See application file for complete search history.

(56) References Cited

U.S. PATENT DOCUMENTS

| | | |
|---|---|---|
| 6,782,370 B1 | 8/2004 | Stack |
| 6,853,982 B2 | 2/2005 | Smith et al. |
| 7,584,159 B1 | 9/2009 | Chakrabarti et al. |
| 7,637,426 B1 | 12/2009 | Green |

(Continued)

OTHER PUBLICATIONS

Chea; Revitalizing_the_Ps_of_E-Marketing_with_Customer_Experience_Management; IEEE 2012; pp. 3208-3217; 2012.*

(Continued)

*Primary Examiner* — Radu Andrei
(74) *Attorney, Agent, or Firm* — Alston & Bird LLP

(57) ABSTRACT

In general, embodiments of the present invention provide systems, methods and computer readable media for recommending contextually relevant promotions to consumers in order to facilitate their discovery of promotions that they are likely to purchase from a promotion and marketing service.

20 Claims, 11 Drawing Sheets

(56) References Cited

U.S. PATENT DOCUMENTS

| | | | |
|---|---|---|---|
| 7,676,400 B1 | 3/2010 | Dillon | |
| 7,720,720 B1 | 5/2010 | Sharma et al. | |
| 7,991,650 B2 | 8/2011 | Kane, Jr. | |
| 8,239,287 B1 | 8/2012 | Smith et al. | |
| 8,266,014 B1 | 9/2012 | Bhosle et al. | |
| 8,484,203 B1 | 7/2013 | Clancy et al. | |
| 8,630,913 B1 | 1/2014 | Lawrence et al. | |
| 8,684,265 B1* | 4/2014 | McGhie | G06Q 20/105 235/487 |
| 10,699,299 B1 | 6/2020 | Hou et al. | |
| 2003/0033190 A1* | 2/2003 | Shan | G06Q 30/0277 705/7.29 |
| 2003/0182270 A1 | 9/2003 | Kuno et al. | |
| 2004/0093311 A1 | 5/2004 | Chew et al. | |
| 2005/0222989 A1 | 10/2005 | Haveliwala et al. | |
| 2005/0267804 A1 | 12/2005 | Lonsbury et al. | |
| 2007/0179845 A1 | 8/2007 | Jain | |
| 2007/0179846 A1 | 8/2007 | Jain et al. | |
| 2008/0009344 A1 | 1/2008 | Graham et al. | |
| 2008/0201201 A1 | 8/2008 | Pousti et al. | |
| 2008/0294617 A1 | 11/2008 | Chakrabarti et al. | |
| 2009/0006374 A1 | 1/2009 | Kim et al. | |
| 2009/0271275 A1* | 10/2009 | Regmi | G06Q 30/0245 705/14.73 |
| 2010/0063870 A1 | 3/2010 | Anderson et al. | |
| 2010/0242121 A1 | 9/2010 | Johnson et al. | |
| 2011/0015980 A1* | 1/2011 | Li | G06Q 30/02 715/780 |
| 2011/0093361 A1 | 4/2011 | Morales | |
| 2011/0288928 A1 | 11/2011 | Patwa et al. | |
| 2011/0295716 A1* | 12/2011 | Dumon | G06Q 30/0623 705/26.61 |
| 2013/0013622 A1 | 1/2013 | Elliot-McCrea et al. | |
| 2013/0080319 A1 | 3/2013 | Greenstone | |
| 2013/0204830 A1 | 8/2013 | Franke | |
| 2013/0211964 A1 | 8/2013 | Hampton | |
| 2014/0052688 A1 | 2/2014 | Bansal | |
| 2014/0114797 A1 | 4/2014 | Huang et al. | |
| 2014/0172627 A1 | 6/2014 | Levy et al. | |
| 2014/0180790 A1 | 6/2014 | Boal | |
| 2014/0214535 A1 | 7/2014 | Kee et al. | |
| 2014/0304032 A1 | 10/2014 | Mitchell et al. | |
| 2014/0330818 A1 | 11/2014 | Raina et al. | |
| 2015/0006294 A1 | 1/2015 | Irmak et al. | |
| 2015/0052502 A1 | 2/2015 | Faillaci et al. | |
| 2015/0073939 A1* | 3/2015 | Flanagan | G06Q 30/0283 705/26.61 |
| 2015/0095185 A1 | 4/2015 | Katukuri et al. | |
| 2015/0100457 A1 | 4/2015 | Scipioni | |
| 2015/0287080 A1* | 10/2015 | Geetha | G06Q 30/0256 705/14.54 |
| 2015/0302449 A1* | 10/2015 | Akbarpour | G06Q 30/0643 705/14.23 |

OTHER PUBLICATIONS

Steinfield; Integrating_brick_and_mortar_locations_with_e-commerce_understanding_synergy_opportunities; HICSS 2002; 10 pages; 2002.*

Chea; Revitalizing_the_Ps_of_E-Marketing_with_Customer_Experience_Management; HICSS 2012; pp. 3208-3217; 2012.

File History of U.S. Appl. No. 14/693,725, filed Apr. 22, 2015 by Feili Hou, entitled "Generating In-Channel and Cross-Channel Promotion Recommendations Using Promotion Similarity" (Apr. 22, 2015-Jan. 8, 2018), 250 pages.

File History of U.S. Appl. No. 14/693,725, filed Apr. 22, 2015 by Feili Hou, entitled "Generating In-Channel and Cross-Channel Promotion Recommendations Using Promotion Similarity" (Jan. 8, 2018-Mar. 3, 2020), 299 pages.

Mehrbakhsh Nilashi, Othman bin Ibrahim, Norafida Ithnin; Hybrid recommendation approaches for multi-criteria collaborative filtering; available online Dec. 23, 2013; http://dx.coi.org/10.1016/j.eswa.2013.12.023; pp. 3879-3900 (Year: 2013).

Mild, A., & Reutterer, T. (2003). An improved collaborative filtering approach for predicting cross-category purchases based on binary market basket data. Journal of Retailing and Consumer Services, 10, 123-133. (Year: 2003).

Muralidharan; Deal or No Deal Catering to User Preferences; IEEE 2014; pp. 199-202; 2014.

Nan Hu; Do Links Matter? IEEE 2012, vol. 59 No. 2; pp. 189-200; 2012.

Romadhony, Ade; Faraby, Said Al; Pudjoatmodjo, Bambang; Online Shopping Recommender System Using Hybrid Method; 2013 International Conference of Information and Communication Technology (IcoICT) pp. 166-169 (2013) reproduced via: ip.com and ieee explore. (Year: 2013).

Sun; Designing_promotions_Consumers_surprise_and_perception_of_discounts; IBM 2014; 10 pages; 2014.

U.S. Application as filed Apr. 22, 2015, U.S. Appl. No. 14/693,712.

U.S. Application No. as filed Apr. 22, 2015, U.S. Appl. No. 14/693,725.

* cited by examiner

GENERATING OPTIMIZED IN-CHANNEL AND CROSS-CHANNEL PROMOTION RECOMMENDATIONS USING FREE SHIPPING QUALIFIER

CROSS-REFERENCE TO RELATED APPLICATIONS

This application is a continuation of U.S. patent application Ser. No. 16/879,330, titled "GENERATING OPTIMIZED IN-CHANNEL AND CROSS-CHANNEL PROMOTION RECOMMENDATIONS USING FREE SHIPPING QUALIFIER," filed May 20, 2020, which is a continuation of U.S. patent application Ser. No. 14/693,721, titled "GENERATING OPTIMIZED IN-CHANNEL AND CROSS-CHANNEL PROMOTION RECOMMENDATIONS USING FREE SHIPPING QUALIFIER" and filed Apr. 22, 2015, which claims the benefit of U.S. Provisional Application No. 61/989,977, entitled "GENERATING OPTIMIZED IN-CHANNEL AND CROSS-CHANNEL PROMOTION RECOMMENDATIONS USING FREE SHIPPING QUALIFIER," and filed May 7, 2014, and of U.S. Provisional Application No. 61/982,834, entitled "SYSTEMS AND METHODS FOR PROVIDING RELATED PROMOTIONS," and filed Apr. 22, 2014, the entire contents of which are hereby incorporated by reference.

This application is related to U.S. application Ser. No. 14/693,725, filed Apr. 22, 2015, entitled "GENERATING IN-CHANNEL AND CROSS-CHANNEL PROMOTION RECOMMENDATIONS USING PROMOTION SIMILARITY," and U.S. application Ser. No. 14/693,712, filed Apr. 22, 2015, entitled "GENERATING IN-CHANNEL AND CROSS-CHANNEL PROMOTION RECOMMENDATIONS USING PROMOTION CROSS-SELL."

FIELD

Embodiments of the invention relate, generally, to generating contextually relevant promotion recommendations.

BACKGROUND

Current methods for generating promotion recommendations exhibit a plurality of problems that make current systems insufficient, ineffective and/or the like. Through applied effort, ingenuity, and innovation, solutions to improve such methods have been realized and are described in connection with embodiments of the present invention.

SUMMARY

In general, embodiments of the present invention provide herein systems, methods and computer readable media for recommending contextually relevant promotions to consumers in order to facilitate their discovery of promotions that they are likely to purchase from a promotion and marketing service. In embodiments, in-channel and cross-channel promotions are selected for recommendation using a hybrid method that combines a modified type of collaborative filtering adapted for limited promotion lifetimes and various stages of the promotion lifecycle with static similarity that leverages promotion characteristics (e.g., multilevel promotion taxonomy, promotion freshness, and proximity of promotion redemption locations and different business verticals) to identify promotions that are relevant to a particular promotion currently being viewed by the user.

In some embodiments, the selection of promotions for recommendation further includes calculating a co-purchase signal based on historical co-purchases of promotions within services. Additionally and/or alternatively, in some embodiments, the selection of promotions for recommendation further includes a real-time optimization to promote recommended promotions that will enable a consumer's cart purchase total to be within a minimum increment above a threshold cart total that activates a free shipping bonus to be applied to the purchases in the cart.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 6:
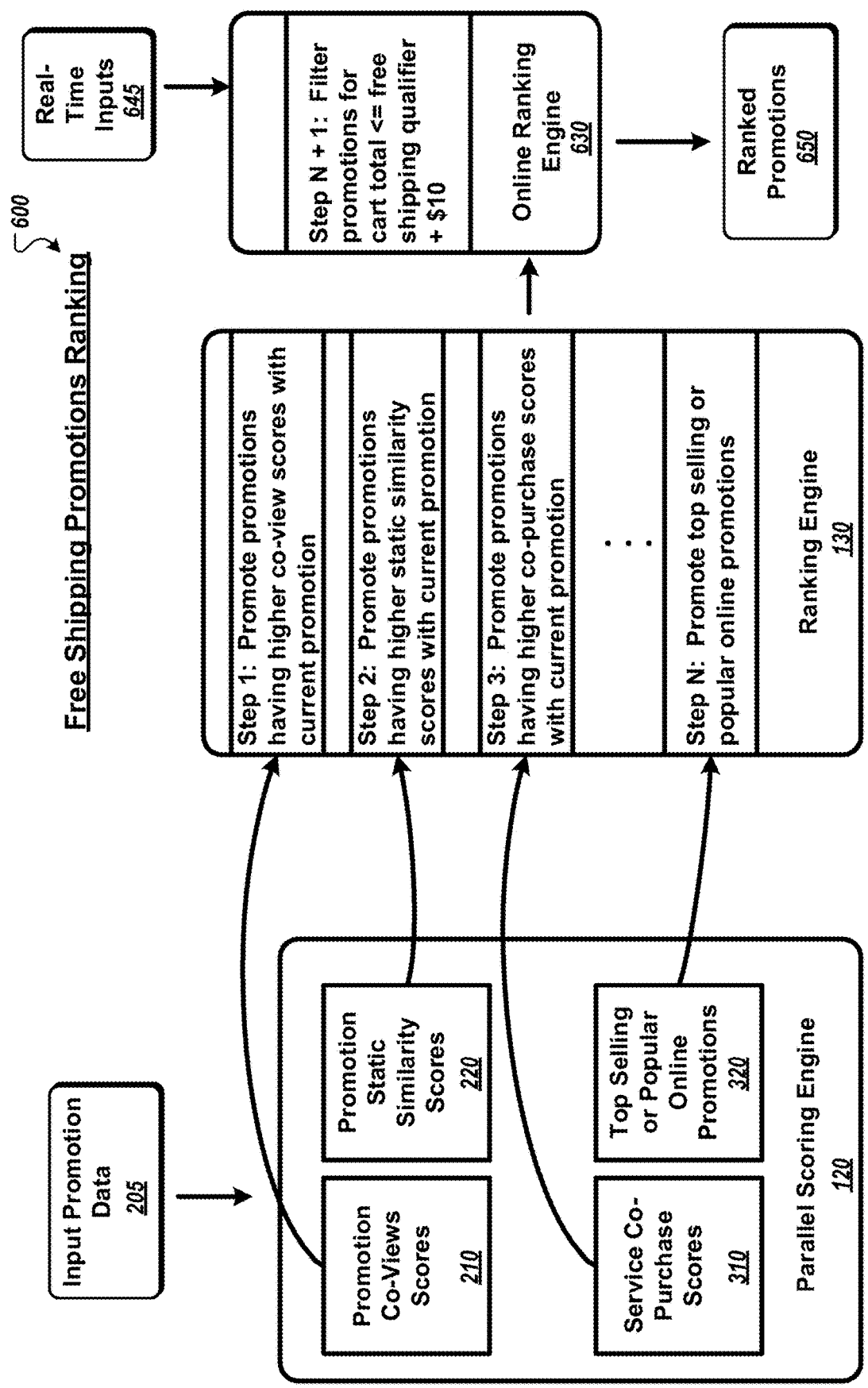
Figure 7A:
Figure 7B:
Figure 7C:
Figure 7D:
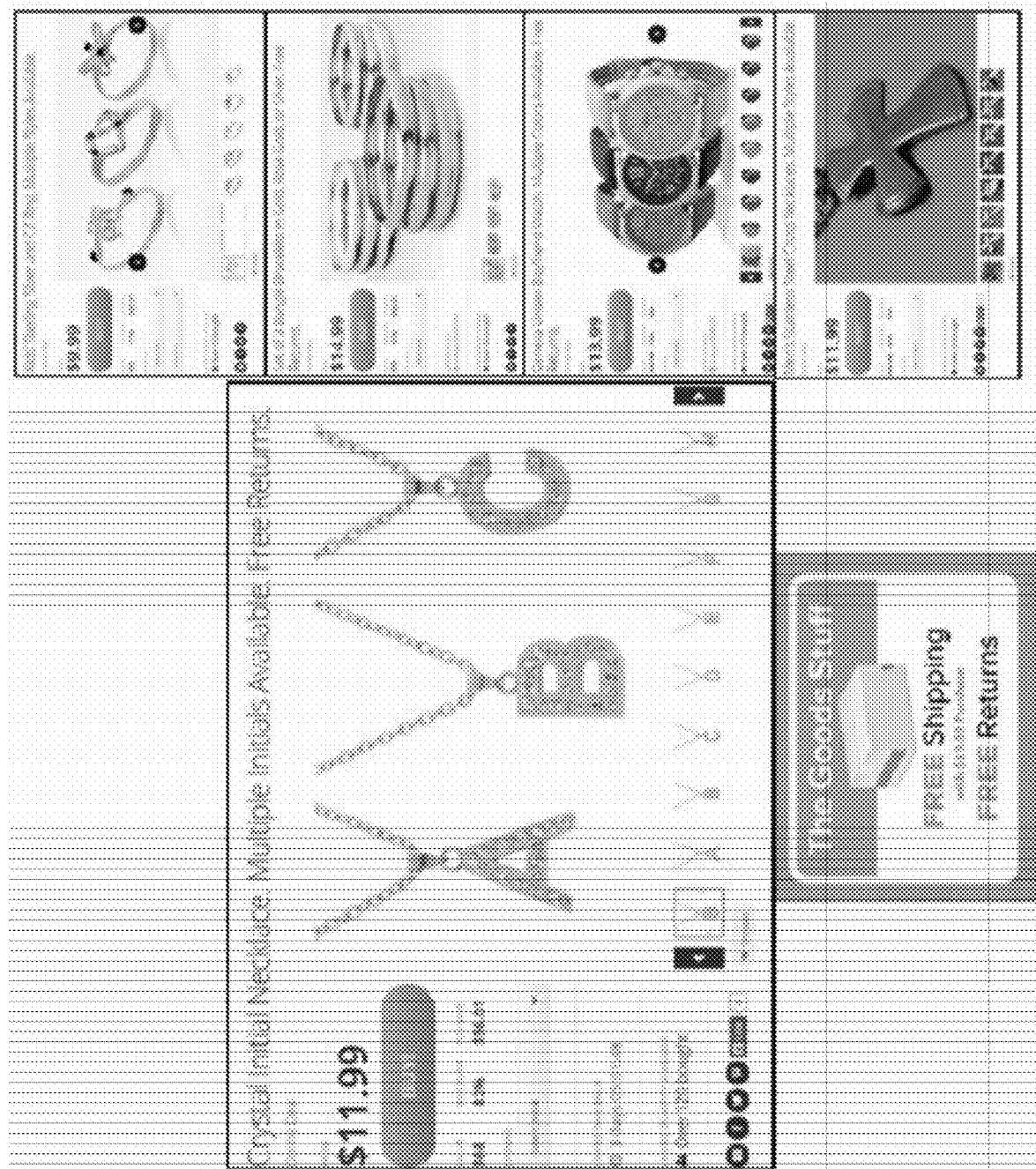
Figure 8:
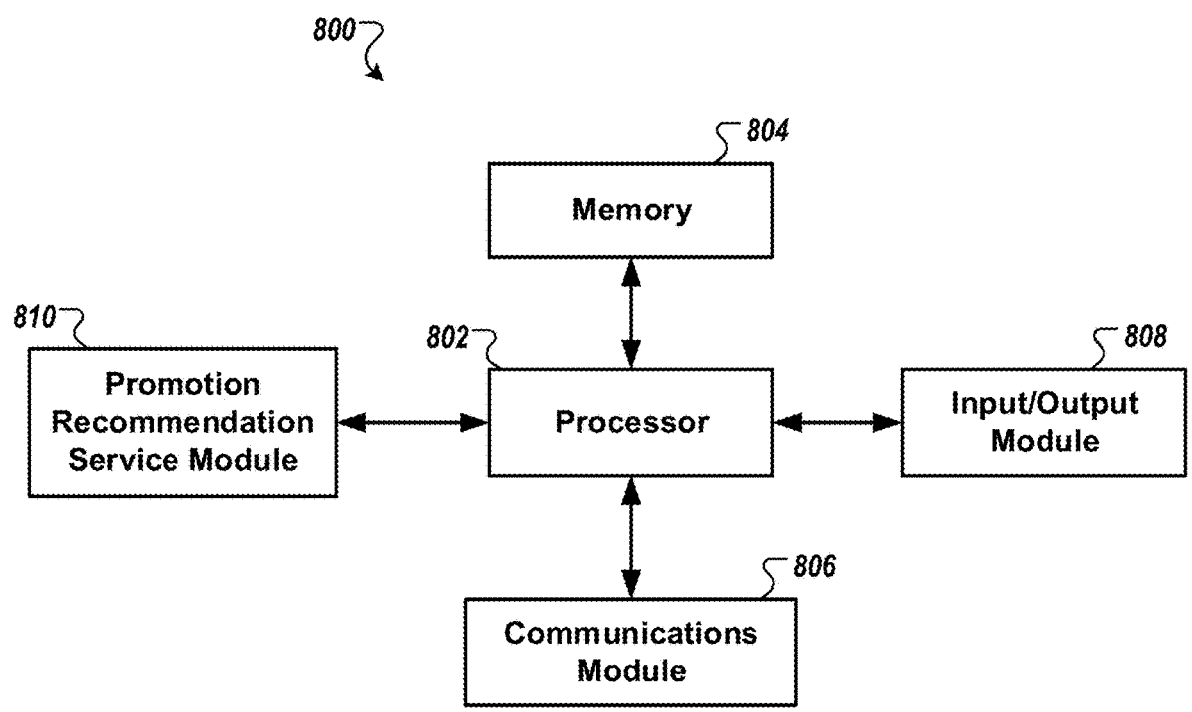

FIG. 6 illustrates a promotion recommendation system configured to implement free shipping promotions ranking to promote an assortment of complimentary and relevant promotions during a consumer's purchase funnel when the total shopping cart purchase total is less than the free shipping qualifier threshold amount set by the promotion and marketing service in accordance with some embodiments discussed herein; and FIG. 7A is an illustration of a user interface presenting a set of recommended promotions based on similarity in accordance with some embodiments discussed herein;

FIG. 7B is an illustration of a user interface presenting a set of recommended cross-sell promotions (post purchase modal) in accordance with some embodiments discussed herein;

FIG. 7C is an illustration of a user interface presenting a set of recommended cross-sell promotions (customers also bought) in accordance with some embodiments discussed herein;

FIG. 7D is an illustration of a user interface presenting a set of recommended promotions (free shipping qualifier) in accordance with some embodiments discussed herein; and FIG. 8 illustrates a schematic block diagram of circuitry that can be included in a computing device, such as a promotion recommendation service module, in accordance with some embodiments discussed herein.

DETAILED DESCRIPTION

The present invention now will be described more fully hereinafter with reference to the accompanying drawings, in which some, but not all embodiments of the invention are shown. Indeed, this invention may be embodied in many different forms and should not be construed as being limited to the embodiments set forth herein; rather, these embodiments are provided so that this disclosure will satisfy applicable legal requirements. Like numbers refer to like elements throughout.

As described herein, system components can be communicatively coupled to one or more of each other. Though the components are described as being separate or distinct, two or more of the components may be combined into a single process or routine. The component functional descriptions provided herein including separation of responsibility for distinct functions is by way of example. Other groupings or other divisions of functional responsibilities can be made as necessary or in accordance with design preferences.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data may be received directly from the another computing device or may be received indirectly via one or more intermediary computing devices, such as, for example, one or more servers, relays, routers, network access points, base stations, and/or the like. Similarly, where a computing device is described herein to send data to another computing device, the data may be sent directly to the another computing device or may be sent indirectly via one or more intermediary computing devices, such as, for example, one or more servers, relays, routers, network access points, base stations, and/or the like.

As used herein, the term "promotion and marketing service" may refer, without limitation, to a service that is accessible via one or more computing devices and is operable to provide example promotion and/or marketing services on behalf of one or more providers that are offering one or more instruments that are redeemable for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "provider" may be used to refer, without limitation, to a merchant, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. For example, a provider may be in the form of a running company that sells attire that is generally used by a person who runs or participates in athletic activities.

As used herein, the terms "promotion," "offer," "deal" and similar terms may be used interchangeably to refer, without limitation, to any type of offered, presented or otherwise indicated reward, discount, coupon, credit, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, and using the running company promotion as an example, the accepted value is $25 and the promotional value is $50. In this example, the residual value may be equal to the accepted value.

As used herein, the term "instrument" may be used, without limitation, to refer to any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned running company as the example provider, an electronic indication in a mobile application that shows $50 of value to spend at the running company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "impression" may be used, without limitation, to refer to a communication, a display, or other perceived indication, such as a flyer, print media, e-mail, text message, application alert, mobile applications, other type of electronic interface or distribution channel and/or the like, of one or more promotions. For example, and using the aforementioned running company as the example provider, an e-mail communication sent to consumers that indicates the availability of a $25 for $50 toward running shoes promotion.

As used herein, the terms "consumer" and "customer" may be used interchangeably to refer, without limitation, to a client, customer, purchaser, shopper, user or the like who may be in the position to or does exchange value for one or more instruments under the terms defined by the one or promotions. For example, and using the aforementioned running company as the example provider, an individual who is interested in purchasing running shoes.

Figure 1:
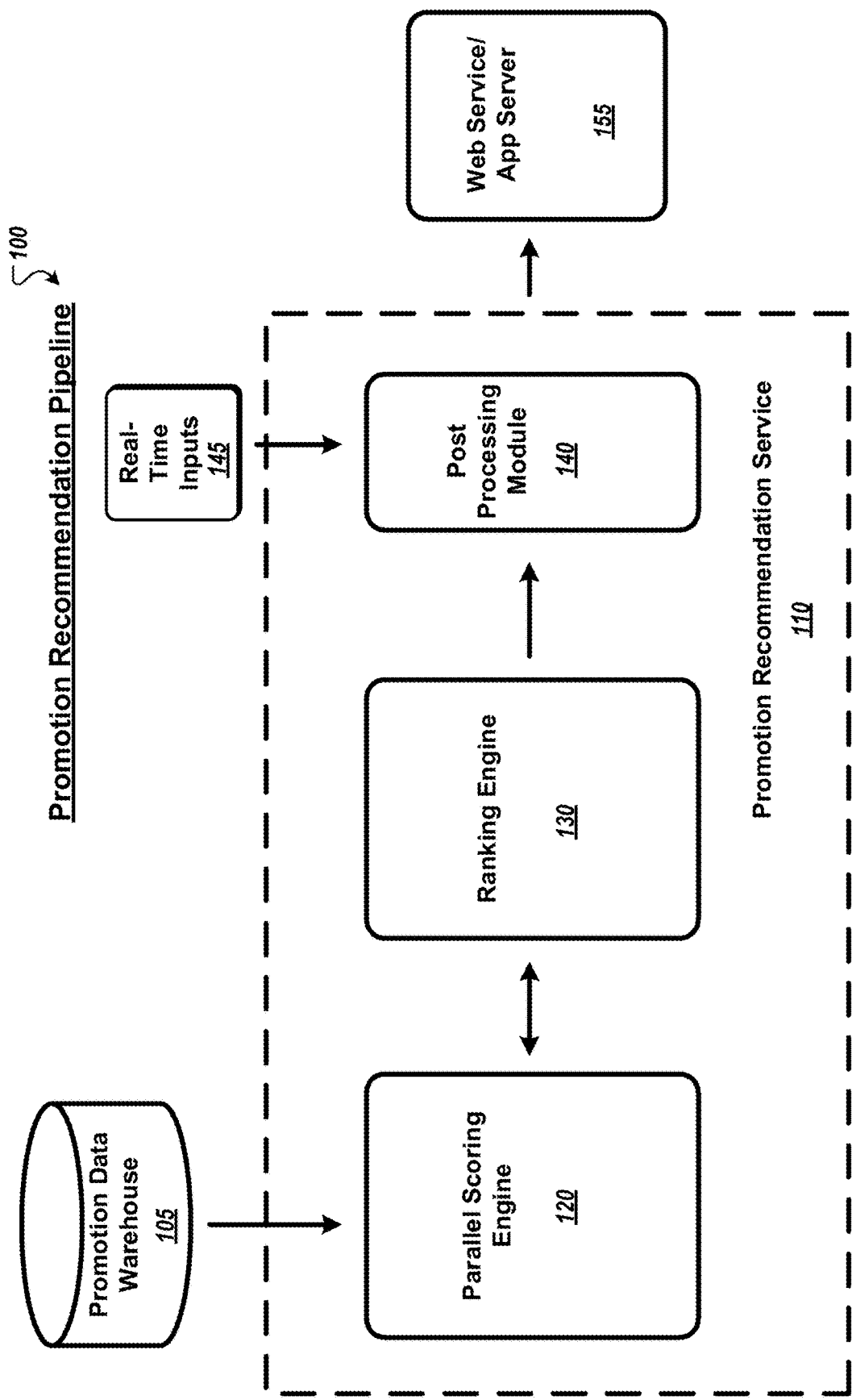
FIG. 1 illustrates an example system that can be configured to implement a promotion recommendation pipeline in accordance with some embodiments discussed herein.

FIG. 1 illustrates an example system 100 that can be configured to implement a promotion recommendation pipeline. In embodiments, system 100 comprises a promotion recommendation service 110 that generates a set of promotions offered by a promotion and marketing service to be recommended to a consumer based on a current promotion with which the consumer is interacting. In embodiments, the promotion recommendation service 110 includes a parallel scoring engine 120 that receives, from a promotion data warehouse 105, input data describing attributes of promotions offered by the promotion and marketing service and, using the input data, generates metadata further describing attributes of the promotions; a ranking engine 130 that orders the promotions using the input data and the metadata and determines a set of recommended promotions based on the ordering; and a post processing module 140 that modifies the ordering of the set of recommended promotions based in part on real-time inputs 145 that may include consumer data and/or current promotion status. In some embodiments, the promotion recommendation service 110 may be an offline service that generates a set of recommended promotions at regular time intervals (e.g., every N hours). In embodiments, system 100 may further comprise a web service and/or an app server configured to receive a set of recommended promotions from the promotion and recommendation service 110 and generate impressions containing content describing the recommended promotions. For example, in some embodiments, the most highly ranked recommended promotions may be featured in the content of a generated impression that is provided to consumers.

Figure 2:
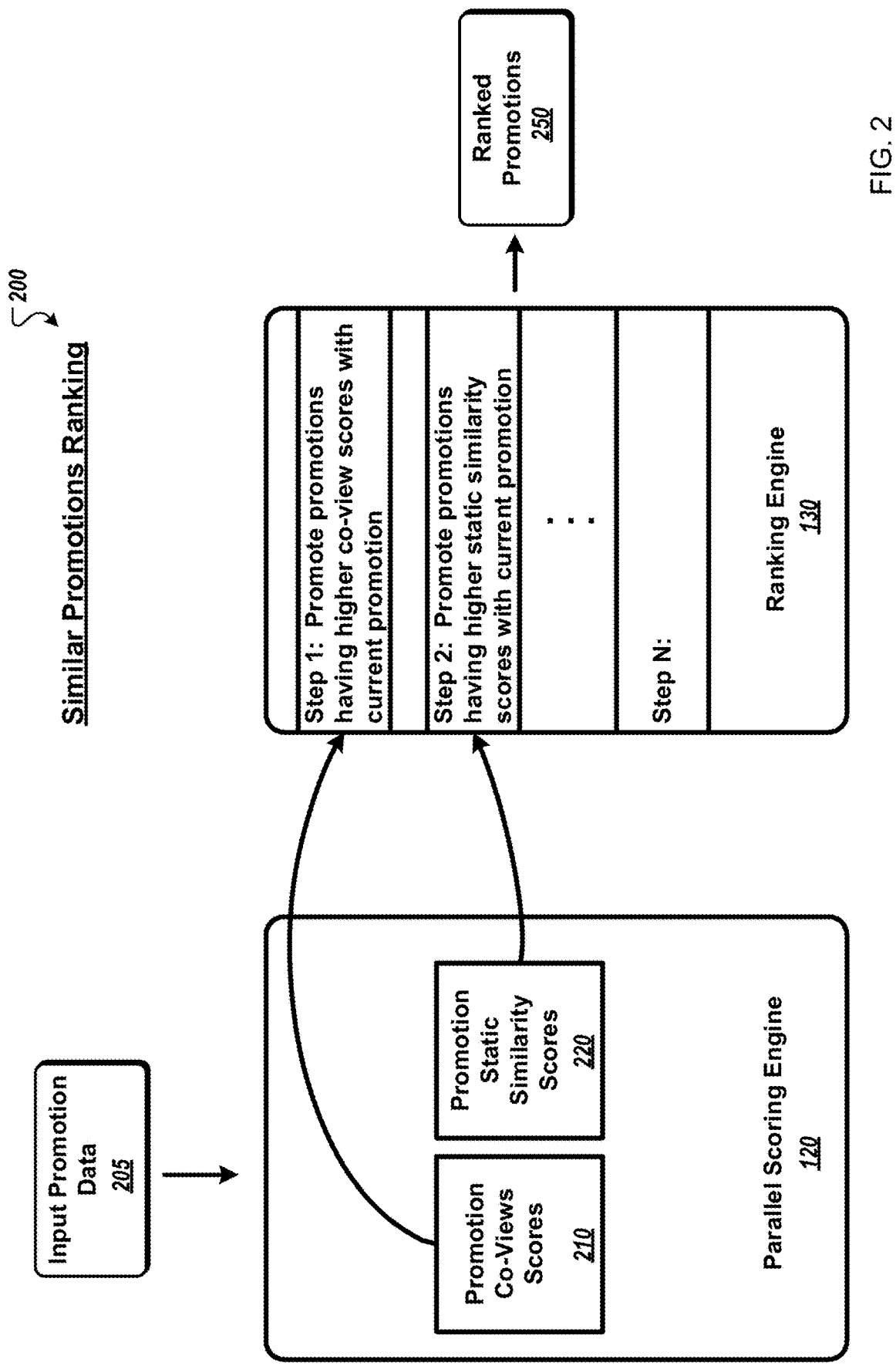
FIG. 2 illustrates a promotion recommendation system configured to implement similar promotions ranking using a hybrid method that combines static similarity of promotions with a modified type of collaborative filtering in accordance with some embodiments discussed herein.

FIG. 2 illustrates a promotion recommendation system 110 configured to implement similar promotions ranking 200 using a hybrid method that combines static similarity of promotions with a modified type of collaborative filtering adapted for limited promotion lifetimes and various stages of the promotion lifecycle. In embodiments, the parallel scoring engine 120 is configured to include a promotion co-views scores module 210 that calculates, using adaptive collaborative filtering based in part on click data, a co-view score associated with each pair of the promotions described by the input promotion data 205. Calculation of a co-view score will be described in detail with reference to method 300.

In embodiments, ranking engine 130 is configured to implement at least one ranking step for generating a ranked list of promotions to be recommended to a consumer. In some embodiments, each ranking step is based on input promotion data and/or metadata that may be calculated by one or more modules in the parallel scoring engine 120. In embodiments in which ranking engine 130 is configured to implement more than one ranking step, at least some of the ranking steps may be implemented in parallel and, additionally and/or alternatively may be implemented serially by chaining.

In some embodiments, ranking engine 130 may include at least one ranking step (e.g., Step 1) for generating a ranked list of promotions, each ranked promotion respectively paired with a promotion X currently being viewed by a consumer, for recommendation to that consumer based in part on their respective co-view scores in terms of their relationship with X. Generating the ranked list based on co-view scores will be described in detail with reference to method 400. In some embodiments, the top K ranked promotions in the generated ranked list 250 are output for recommendation to the consumer viewing X.

In embodiments, the parallel scoring engine 120 is further configured to include a promotion static similarity scores module 220 that calculates a static similarity score for each of the promotions described in the input promotion data 205. In embodiments, a static similarity score may be calculated based on a heuristic approach that leverages a set of promotion attributes (e.g., category, subcategory, location, promotion persona, promotion launch date).

In embodiments, ranking engine 130 may be further configured to implement at least one ranking step (e.g., Step 2) for generating a ranked recommendation list of promotions for a particular consumer viewing a promotion X based on the promotions' respective static similarity scores. For example, promotions that are close by (e.g., within 5 miles) are ranked higher than promotions that are far away (e.g., beyond 5 miles). For a promotion within 5 miles, if it shares the same category/subcategory or the same promotion persona with the promotion X that is being viewed, or if it is a fresh promotion, its rank will be boosted. For a promotion beyond 5 miles, it will be included in the recommendation list only if it belongs to the same category as promotion X.

In some embodiments, the ranked promotions list 250 that is output from a promotion recommendation service 110 is generated by merging collaborative filtering signals (e.g., a collaborative filtering ranked list) with a static similarity signals (e.g., at least one static similarity ranked list). For example, in embodiments, it has been determined based on historical promotion performance data that fresh promotions (i.e., promotions that have recently been launched by a promotion and marketing service) generate high traffic and thus should be highly recommended to consumers. However, fresh promotions typically are associated with sparse click data because not enough time has elapsed since their launch to enable collection of the data. Since adaptive collaborative filtering depends on larger click data samples to generate high quality recommendations, in some embodiments, static similarity is used to backfill collaborative filtering results that may have been calculated based on sparse data.

Figure 3:
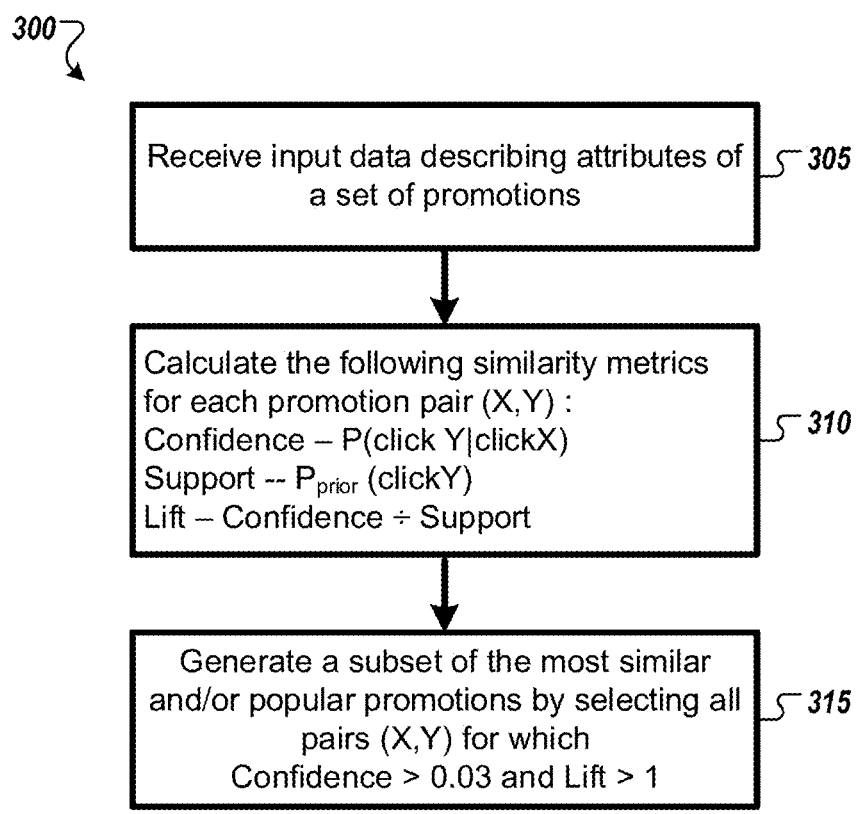
FIG. 3 is a flow diagram of an example method for calculating similarity metrics associated with each pair of the promotions within a set of promotions described by promotion attribute data in accordance with some embodiments discussed herein.

FIG. 3 is a flow diagram of an example method 300 for calculating similarity metrics associated with each pair of the promotions within a set of promotions described by promotion attribute data. For convenience, the method 300 will be described with respect to a system that includes one or more computing devices and performs the method 300. Specifically, the method 300 will be described with respect to processing of input promotion data 205 by promotion co-views scores module 210 in parallel scoring engine 120 of promotion recommendation service 110.

Standard collaborative filtering methods are not configured to take into account the limited lifetime of a promotion (e.g., a promotion only may be offered for a set period of time or until the total quantity of offered promotion instruments has been sold). A standard collaborative filtering method applied, for example, to clickstream data representing consumer behavior during interaction with an impression, may lead to a conclusion that a consumer who clicked on promotion X but not on promotion Y is very likely not interested in promotion Y. However, that conclusion may not be a correct description of the consumer's intent. Because promotions X and Y have separate lifetimes that may or may not overlap, the consumer may not have clicked on promotion Y because promotion Y was not available at the time that the consumer clicked on promotion X. Thus, in embodiments, the association between a promotion that is being viewed and any other live promotion Y is represented by a co-view score calculated using collaborative filtering, adapted for the limited lifetimes of promotions and applied to clickstream data collected from the promotions.

In embodiments, the system receives 305 input promotion data 205 describing attributes of a set of promotions. In embodiments, the input promotion data 205 include clickstream data.

In embodiments, the system calculates 310 similarity metrics for each pair (X,Y) of promotions, where X is the promotion being viewed and Y is any other live promotion. In some embodiments, the similarity metrics include confidence, P (clickY|clickX), the probability of clicking Y give the consumer is viewing X:

$$P\text{ (click } Y|\text{click } X) = \frac{\#\text{ of users who clicked } X \text{ and } Y}{\#\text{ of users who clicked } X \text{ and also visted when } Y \text{ is live}}$$

support, P (clickY), the prior probability of clicking Y $$P\text{ (click } Y) = \frac{\#\text{ of users who clicked } Y}{\#\text{ of users who visted when } Y \text{ is live}}$$

and lift, the ratio of confidence to support:

$$\frac{P\text{ (Click } Y|\text{click } X)}{P\text{ (click } Y)}$$

In embodiments, the system generates 315 a subset of the most similar and/or popular promotions by selecting all pairs (X,Y) for which confidence is above a confidence threshold (e.g., 0.03) and lift is above a lift threshold (e.g., 1).

Figure 4:
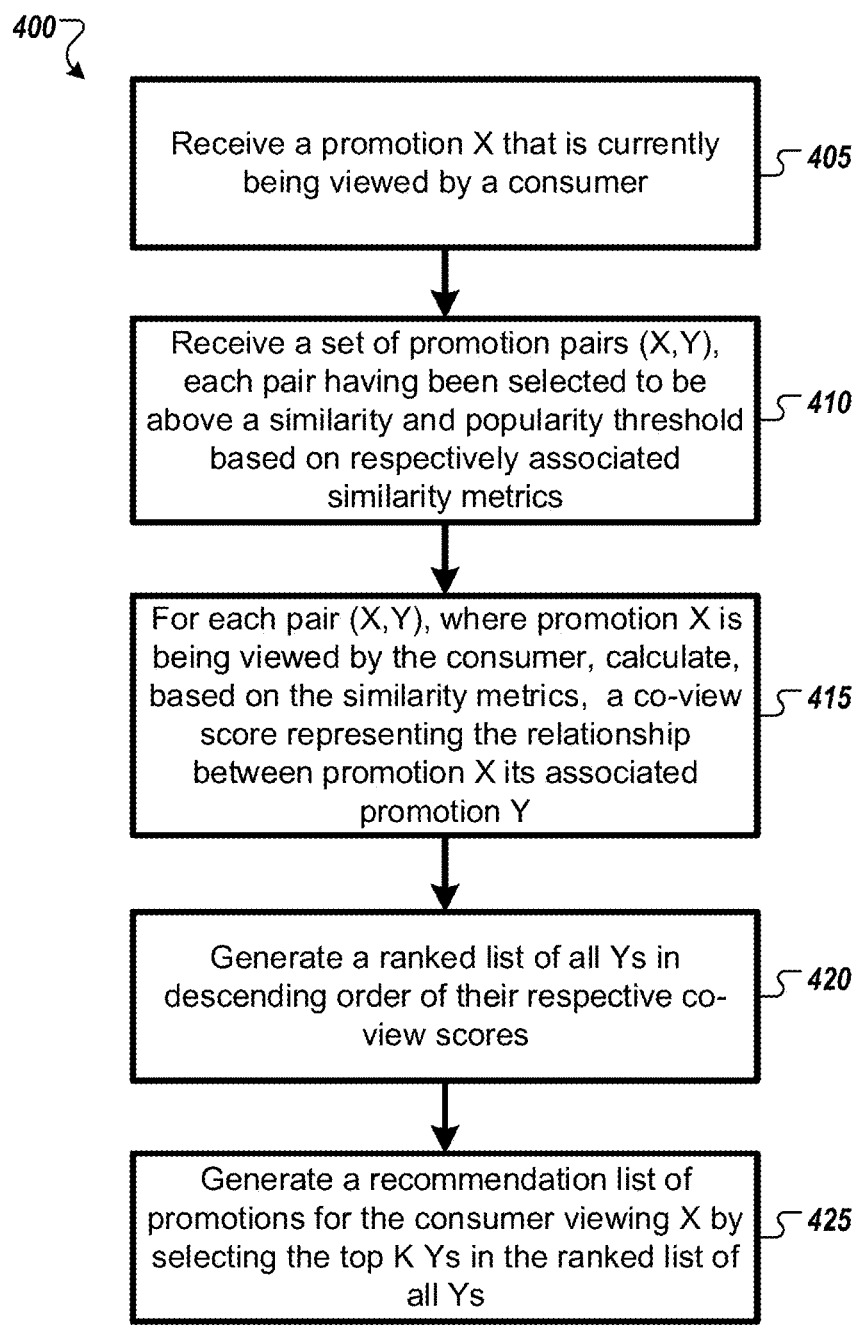
FIG. 4 is a flow diagram of an example method for generating a recommendation list of promotions for a consumer viewing a particular promotion in accordance with some embodiments discussed herein.

FIG. 4 is a flow diagram of an example method 400 for generating a recommendation list of promotions for a consumer viewing a particular promotion. For convenience, the method 400 will be described with respect to a system that includes one or more computing devices and performs the method 400. Specifically, the method 400 will be described with respect to implementation by ranking engine 130 in promotion recommendation service 110.

In embodiments, the system receives 405 a promotion X that is currently being viewed by a consumer and receives 410 a set of promotion pairs (X,Y) in which X is the promotion being viewed and Y is any other live promotion. In embodiments, each of the set of promotion pairs is associated with one or more similarity metrics. In embodiments, the set of promotion pairs is a subset of promotion pairs that have been selected, based on their respective associated similarity metrics, to be above a similarity and popularity threshold as was described previously with reference to method 300. In some embodiments, the similarity and popularity thresholds are a confidence threshold and a lift threshold.

In embodiments, the system calculates 415 a co-view score for each pair using their associated similarity metrics. In some embodiments, the similarity metrics include confidence and lift, as described with reference to method 300, and the co-view score is calculated as the product of confidence and lift.

In embodiments, the system generates 420 a ranked list of all Ys in the promotion pairs in descending order of their respective co-view scores. In embodiments, the system generates 425 a recommendation list of promotions for the consumer viewing promotion X by selecting the top K ranked Ys.

Figure 5:
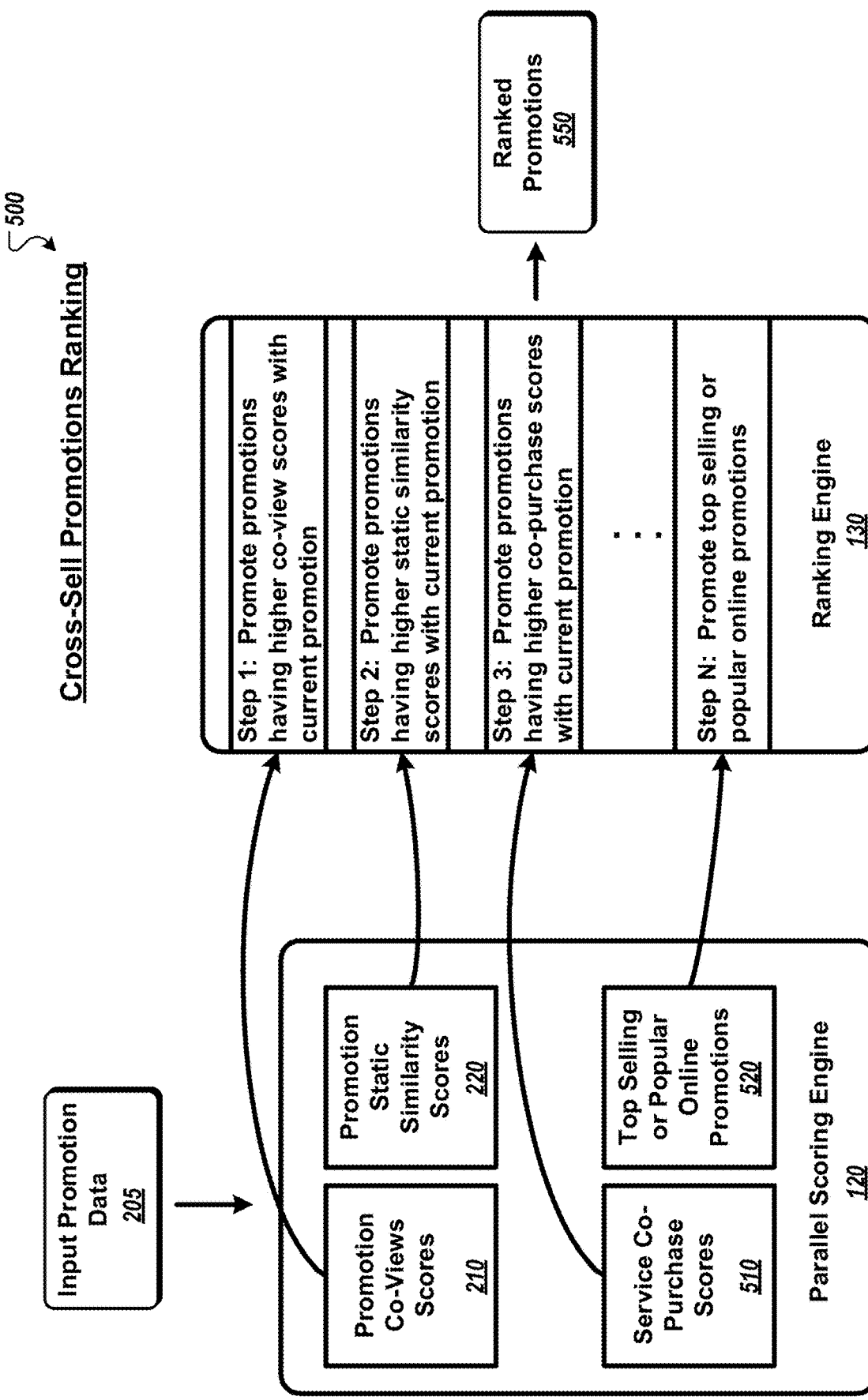
FIG. 5 illustrates a promotion recommendation system configured to implement cross-sell promotions ranking to promote an assortment of complimentary and relevant promotions during a consumer's purchase funnel in accordance with some embodiments discussed herein.

FIG. 5 illustrates a promotion recommendation system 110 configured to implement cross-sell promotions ranking 500 to promote an assortment of complimentary and relevant promotions during a consumer's purchase funnel (i.e., provide recommendations to a consumer who has just completed a purchase). Cross-sell recommendations provide at least the following advantages to a promotion and marketing service: facilitate the consumer's discovery of promotions that may be dissimilar, but complimentary, to the promotion being purchased; and enriching the consumer's user experience by enhanced suggestions based on co-purchase behavior. The enriched user experience may facilitate discovery of other promotions and products interesting enough to keep a consumer returning to the promotion and marketing service, increasing the consumer's longer term engagement.

In embodiments, determining cross-sell recommendations may be based on one or a combination of widgets including user-specific recommendations (i.e., based on recent purchase history), a views-based conversion widget (among consumers who viewed this promotion, what portion of consumers went on to buy this promotion vs. other viewed promotions), a purchase-based widget (among consumers who purchased this promotion, what portion of consumers went on to buy this promotion vs. other purchased promotions), a search history widget (consumer's search history), and newly launched promotions relevant to the consumer (e.g., location).

In embodiments, the parallel scoring engine 120 is further configured to include a service co-purchase scores module 510 that calculates and assigns co-purchase scores to promotions based on historical co-purchases from promotion services (i.e., business verticals) over a period of time. In some embodiments, calculating a co-purchase score may include:

Using input promotion data 205, calculate how many users who purchased promotions from service 1 (S1) also purchased promotions from service 2 (S2) within a time window (e.g., one month). In some embodiments, the time window may be a fixed window while, additionally and/or alternatively in other embodiments, the time window may be a sliding window Calculate PDS and Jaccard scores for each promotion service (#who bought both S1 and S2)/(#who bought S1+#who bought S2−#who bought both S1 and S2) with modifications/filters to reduce influence from popular promotions and services In embodiments, the ranking engine 130 is configured to implement co-views and static similarity ranking steps (e.g., ranking steps 1 and 2 as described with reference to FIG. 2), and is further configured to include at least one cross-sell ranking step (e.g., step 3) that promotes promotions having higher co-purchases with the promotion being currently purchased.

In some embodiments, for example, a cross-sell ranking step may be implemented as follows:

- Choose 15 top scoring recommended promotions (from step 1), one each from each of the top recommended service categories (from step 2)
- If there are not at least 5 recommendations, then pick up more promotions from each service (with a max allowed limit of 3 per service)
- If that is not enough (since some categories may have a very weak or no significant co-purchase signal with other services) then backfill with recommendations from step 1 based on the original score
- Otherwise, in the absence of any recommendations by these above methods, backfill with top revenue-earning freshly launched promotions In embodiments, parallel scoring engine 120 is further configured to include a top selling or popular online promotions module 520 for identifying top revenue-earning freshly launched promotions based on the input promotion data 205, and ranking engine 130 is further configured to implement at least one ranking step (e.g., step N) that promotes top selling or popular online promotions based on metadata calculated by a top selling or popular online promotions module 520.

FIG. 6 illustrates a promotion recommendation system 110 configured to implement free shipping promotions ranking 600 to promote an assortment of complimentary and relevant promotions during a consumer's purchase funnel when the total shopping cart purchase total is less than the free shipping qualifier threshold amount set by the promotion and marketing service. Free shipping qualifier recommendations provide at least the following advantages to a promotion and marketing service: present, to consumers, promotions that are likely to be bought together with the items in the shopping cart; enrich the user experience by enhanced suggestions based on co-purchase behavior and facilitate discovery of other promotions and products interesting enough to keep bringing back the user to the promotion and marketing services site and increase the consumer's longer term engagement; and optimize the final recommendations made to the consumer based on price, free shipping qualifier threshold, location of the inventory of goods in warehouse, and/or other logistics and supply chain factors.

In embodiments, the promotion and recommendation system 110 is further configured to include an online ranking engine 630 that is configured to receive a set of ranked promotions (e.g. ranked promotions 550) and real-time inputs 645 (e.g., price, location) and, based on those inputs, optimize the output recommended promotions 650 by filtering out ranked promotions except those that, if purchased, would reduce the consumer's shipping costs and product expected delivery times.

For example, in some embodiments, the free shipping qualifier threshold amount set by the promotion and marketing service is $19.99, and a free shipping promotions ranking step may be implemented as follows:

- Select 15 top scoring recommended promotions (from step 1), one each from each of the top recommended service categories (from step 2). The price constraints are ($19.99<Current cart billing+recommend item's price<$29.99)
- If there are not at least 5 recommendations, then select more promotions from each service (with a max allowed limit of 3 per service) with the same price constraints applied
- If that is not enough (since some categories may have a very weak or no significant co-purchase signal with other services) then backfill with recommendations from step 1 based on the original score (again with the price constraints from above)
- Otherwise, in the absence of any recommendations by these above methods, backfill with top revenue-earning freshly launched promotions In some embodiments, recommended promotions are presented to a consumer in a custom user interface that includes immediate purchase options for the recommended promotions. Exemplary user interfaces are illustrated for clarity without limitation in FIGS. 7A, 7B, 7C, and 7D.

FIG. 7A is an illustration of a user interface 700A presenting a set of recommended promotions based on similarity.

FIG. 7B is an illustration of a user interface 700B presenting a set of recommended cross-sell promotions (post purchase modal).

FIG. 7C is an illustration of a user interface 700C presenting a set of recommended cross-sell promotions (customers also bought).

FIG. 7D is an illustration of a user interface 700D presenting a set of recommended promotions (free shipping qualifier).

FIG. 8 shows a schematic block diagram of circuitry 800, some or all of which may be included in, for example, promotion recommendation service 110. As illustrated in FIG. 8, in accordance with some example embodiments, circuitry 800 can include various means, such as processor 802, memory 804, communications module 806, and/or input/output module 808. As referred to herein, "module" includes hardware, software and/or firmware configured to perform one or more particular functions. In this regard, the means of circuitry 800 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 804) that is executable by a suitably configured processing device (e.g., processor 802), or some combination thereof.

Processor 802 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 8 as a single processor, in some embodiments processor 802 comprises a plurality of processors. The plurality of processors may be embodied on a single computing device or may be distributed across a plurality of computing devices collectively configured to function as circuitry 800. The plurality of processors may be in operative communication with each other and may be collectively configured to perform one or more functionalities of circuitry 800 as described herein. In an example embodiment, processor 802 is configured to execute instructions stored in memory 804 or otherwise accessible to processor 802. These instructions, when executed by processor 802, may cause circuitry 800 to perform one or more of the functionalities of circuitry 800 as described herein.

Whether configured by hardware, firmware/software methods, or by a combination thereof, processor 802 may comprise an entity capable of performing operations according to embodiments of the present invention while configured accordingly. Thus, for example, when processor 802 is embodied as an ASIC, FPGA or the like, processor 802 may comprise specifically configured hardware for conducting one or more operations described herein. Alternatively, as another example, when processor 802 is embodied as an executor of instructions, such as may be stored in memory 804, the instructions may specifically configure processor 802 to perform one or more algorithms and operations described herein, such as those discussed in connection with FIGS. 1-6.

Memory 804 may comprise, for example, volatile memory, non-volatile memory, or some combination thereof. Although illustrated in FIG. 8 as a single memory, memory 804 may comprise a plurality of memory components. The plurality of memory components may be embodied on a single computing device or distributed across a plurality of computing devices. In various embodiments, memory 804 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 804 may be configured to store information, data (including analytics data), applications, instructions, or the like for enabling circuitry 800 to carry out various functions in accordance with example embodiments of the present invention. For example, in at least some embodiments, memory 804 is configured to buffer input data for processing by processor 802. Additionally or alternatively, in at least some embodiments, memory 804 is configured to store program instructions for execution by processor 802. Memory 804 may store information in the form of static and/or dynamic information. This stored information may be stored and/or used by circuitry 800 during the course of performing its functionalities.

Communications module 806 may be embodied as any device or means embodied in circuitry, hardware, a computer program product comprising computer readable program instructions stored on a computer readable medium (e.g., memory 804) and executed by a processing device (e.g., processor 802), or a combination thereof that is configured to receive and/or transmit data from/to another device, such as, for example, a second circuitry 800 and/or the like. In some embodiments, communications module 806 (like other components discussed herein) can be at least partially embodied as or otherwise controlled by processor 802. In this regard, communications module 806 may be in communication with processor 802, such as via a bus. Communications module 806 may include, for example, an antenna, a transmitter, a receiver, a transceiver, network interface card and/or supporting hardware and/or firmware/software for enabling communications with another computing device. Communications module 806 may be configured to receive and/or transmit any data that may be stored by memory 804 using any protocol that may be used for communications between computing devices. Communications module 806 may additionally or alternatively be in communication with the memory 804, input/output module 808 and/or any other component of circuitry 800, such as via a bus.

Input/output module 808 may be in communication with processor 802 to receive an indication of a user input and/or to provide an audible, visual, mechanical, or other output to a user. Some example visual outputs that may be provided to a user by circuitry 800 are discussed in connection with FIG. 1. As such, input/output module 808 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 800 is embodied as a server or database, aspects of input/output module 808 may be reduced as compared to embodiments where circuitry 800 is implemented as an end-user machine or other type of device designed for complex user interactions. In some embodiments (like other components discussed herein), input/output module 808 may even be eliminated from circuitry 800. Alternatively, such as in embodiments wherein circuitry 800 is embodied as a server or database, at least some aspects of input/output module 808 may be embodied on an apparatus used by a user that is in communication with circuitry 800. Input/output module 808 may be in communication with the memory 804, communications module 806, and/or any other component(s), such as via a bus. Although more than one input/output module and/or other component can be included in circuitry 800, only one is shown in FIG. 8 to avoid overcomplicating the drawing (like the other components discussed herein).

Promotion recommendation service module 810 may also or instead be included and configured to perform the functionality discussed herein related to the promotion recommendation service discussed above. In some embodiments, some or all of the functionality of promotion recommendation may be performed by processor 802. In this regard, the example processes and algorithms discussed herein can be performed by at least one processor 802 and/or promotion recommendation service module 810. For example, non-transitory computer readable media can be configured to store firmware, one or more application programs, and/or other software, which include instructions and other computer-readable program code portions that can be executed to control each processor (e.g., processor 802 and/or promotion recommendation service module 810) of the components of system 110 to implement various operations, including the examples shown above. As such, a series of computer-readable program code portions are embodied in one or more computer program products and can be used, with a computing device, server, and/or other programmable apparatus, to produce machine-implemented processes.

Any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of system 110. In some embodiments, one or more external systems (such as a remote cloud computing and/or data storage system) may also be leveraged to provide at least some of the functionality discussed herein.

As described above in this disclosure, aspects of embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flow diagrams, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 802 and/or promotion recommendation service module 810 discussed above with reference to FIG. 8, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 804) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising at least one processor and at least one non-transitory memory comprising program code, wherein the at least one non-transitory memory and the program code are configured to, with the at least one processor, cause the apparatus to:

receive promotion data associated with a promotion set, the promotion set comprising a plurality of promotions including a particular promotion associated with a first consumer;

generate a ranked promotion set based at least in part on the promotion data, wherein the ranked promotion set comprises a collaborative filtering ranked list and a static similarity ranked list; and transmit a subset of promotions selected from the ranked promotion set to a client device associated with the first consumer for display within a user interface of the client device.

2. The apparatus of claim 1, wherein the ranked promotion set is generated based at least in part on a historical co-purchase representing a purchase that is performed by a consumer different from the first consumer.

3. The apparatus of claim 2, wherein the at least one non-transitory memory and the program code are further configured to, with the at least one processor, cause the apparatus to:

determine a co-purchase score for the historical co-purchase based at least in part on calculating a frequency of purchase by consumers of promotions associated with a first service and purchases by those same consumers of promotions associated with a second service; and rank the promotions of the ranked promotion set in descending order of their respective co-purchase scores.

4. The apparatus of claim 1, wherein the promotion data comprises promotion attributes associated with promotions of the plurality of promotions, and wherein each promotion of the ranked promotion set is associated with promotion attributes that differ from promotion attributes associated with the particular promotion.

5. The apparatus of claim 1, wherein the ranked promotion set is generated based at least in part on one or more of a co-view score or cross-sell signal received from at least one of a group of cross-sell widgets.

6. The apparatus of claim 5, wherein the group of cross-sell widgets comprises one or more of a user-specific recommendations widget that collects signals based on recent purchase history, a views-based conversion widget that collects signals describing a portion of consumers that went on to buy the particular promotion versus other viewed promotions, a purchase-based widget that collects signals describing a portion of consumers that went on to buy the particular promotion versus other purchased promotions, a search history widget that collects signals describing a consumer's search history, or a newly launched promotions widget that collects signals describing newly launched promotions relevant to a consumer.

7. The apparatus of claim 1, wherein the subset of promotions is optimized, based on one or more real-time inputs, by filtering out those ranked promotions that, if purchased, would reduce at least one of a shipping cost or an expected delivery time.

8. The apparatus of claim 1, wherein the at least one non-transitory memory and the program code are further configured to, with the at least one processor, cause the apparatus to:

select the subset of promotions from the ranked promotion set, wherein each promotion of the subset of promotions meets a price constraint, wherein the price constraint comprises a sum of a promotion price and a current purchase total of the first consumer, wherein the price constraint is greater than a free shipping qualifier threshold amount and less than a sum of the free shipping qualifier threshold amount plus an increment; and in an instance in which a number of promotions in the subset of promotions is less than a threshold promotion quantity, select, based in part on the price constraint, additional promotions by selecting up to a maximum quantity of promotions from each of a set of services respectively associated with at least one promotion of the recommended promotion set.

9. A computer-implemented method comprising:

receiving promotion data associated with a promotion set, the promotion set comprising a plurality of promotions including a particular promotion associated with a first consumer;

generating a ranked promotion set based at least in part on the promotion data, wherein the ranked promotion set comprises a collaborative filtering ranked list and a static similarity ranked list; and transmitting a subset of promotions selected from the ranked promotion set to a client device associated with the first consumer for display within a user interface of the client device.

10. The computer-implemented method of claim 9, wherein the ranked promotion set is generated based at least in part on a historical co-purchase representing a purchase that is performed by a consumer different from the first consumer.

11. The computer-implemented method of claim 10, further comprising:

determine a co-purchase score for the historical co-purchase based at least in part on calculating a frequency of purchase by consumers of promotions associated with a first service and purchases by those same consumers of promotions associated with a second service; and rank the promotions of the ranked promotion set in descending order of their respective co-purchase scores.

12. The computer-implemented method of claim 9, wherein the promotion data comprises promotion attributes associated with promotions of the plurality of promotions, and wherein each promotion of the ranked promotion set is associated with promotion attributes that differ from promotion attributes associated with the particular promotion.

13. The computer-implemented method of claim 9, wherein the ranked promotion set is generated based at least in part on one or more of a co-view score or cross-sell signal received from at least one of a group of cross-sell widgets.

14. The computer-implemented method of claim 13, wherein the group of cross-sell widgets comprises one or more of a user-specific recommendations widget that collects signals based on recent purchase history, a views-based conversion widget that collects signals describing a portion of consumers that went on to buy the particular promotion versus other viewed promotions, a purchase-based widget that collects signals describing a portion of consumers that went on to buy the particular promotion versus other purchased promotions, a search history widget that collects signals describing a consumer's search history, or a newly launched promotions widget that collects signals describing newly launched promotions relevant to a consumer.

15. The computer-implemented method of claim 9, wherein the subset of promotions is optimized, based on one or more real-time inputs, by filtering out those ranked promotions that, if purchased, would reduce at least one of a shipping cost or an expected delivery time.

16. The computer-implemented method of claim 9, further comprising:

select the subset of promotions from the ranked promotion set, wherein each promotion of the subset of promotions meets a price constraint, wherein the price constraint comprises a sum of a promotion price and a current purchase total of the first consumer, wherein the price constraint is greater than a free shipping qualifier threshold amount and less than a sum of the free shipping qualifier threshold amount plus an increment; and in an instance in which a number of promotions in the subset of promotions is less than a threshold promotion quantity, select, based in part on the price constraint, additional promotions by selecting up to a maximum quantity of promotions from each of a set of services respectively associated with at least one promotion of the recommended promotion set.

17. A non-transitory computer readable medium, comprising instructions that when executed on one or more computers cause the one or more computers to:

receive promotion data associated with a promotion set, the promotion set comprising a plurality of promotions including a particular promotion associated with a first consumer;

generate a ranked promotion set based at least in part on the promotion data, wherein the ranked promotion set comprises a collaborative filtering ranked list and a static similarity ranked list; and transmit a subset of promotions selected from the ranked promotion set to a client device associated with the first consumer for display within a user interface of the client device.

18. The non-transitory computer readable medium of claim 17, wherein the ranked promotion set is generated based at least in part on a historical co-purchase representing a purchase that is performed by a consumer different from the first consumer.

19. The non-transitory computer readable medium of claim 17, wherein the subset of promotions is optimized, based on one or more real-time inputs, by filtering out those ranked promotions that, if purchased, would reduce at least one of a shipping cost or an expected delivery time.

20. The non-transitory computer readable medium of claim 17, wherein the ranked promotion set is generated based at least in part on one or more of a co-view score or cross-sell signal received from at least one of a group of cross-sell widgets.

* * * * *